Nov. 24, 1936.　　　T. TARISIEN　　　2,061,883
HIGH SPEED PASSENGER BRAKE
Filed Jan. 8, 1935　　　2 Sheets-Sheet 2
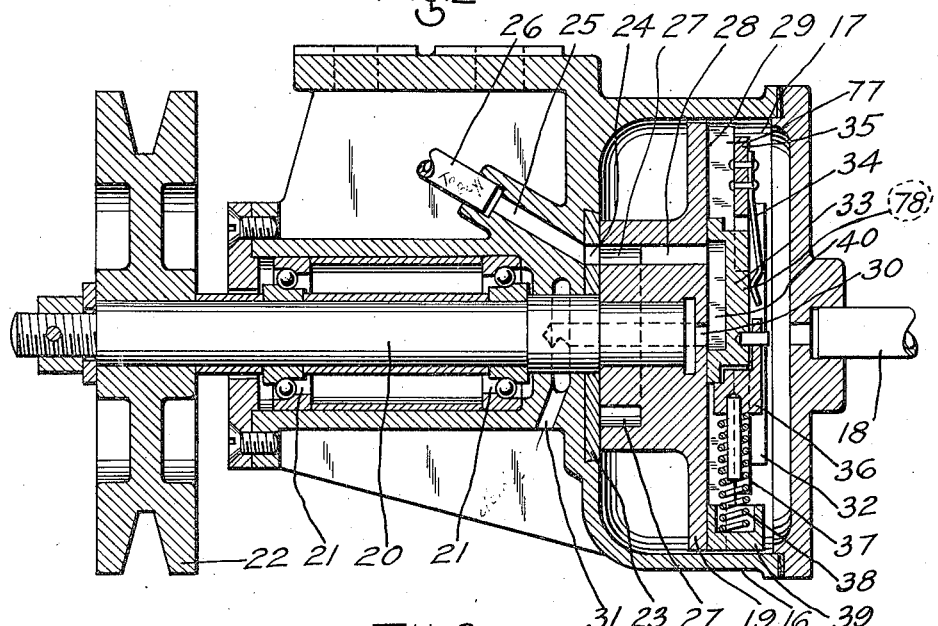
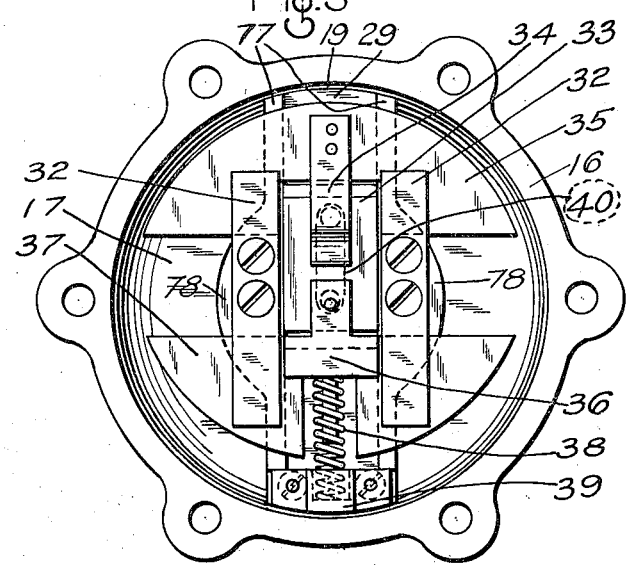
INVENTOR
THEOPHILE TARISIEN
BY Wm. M. Cady
ATTORNEY Patented Nov. 24, 1936

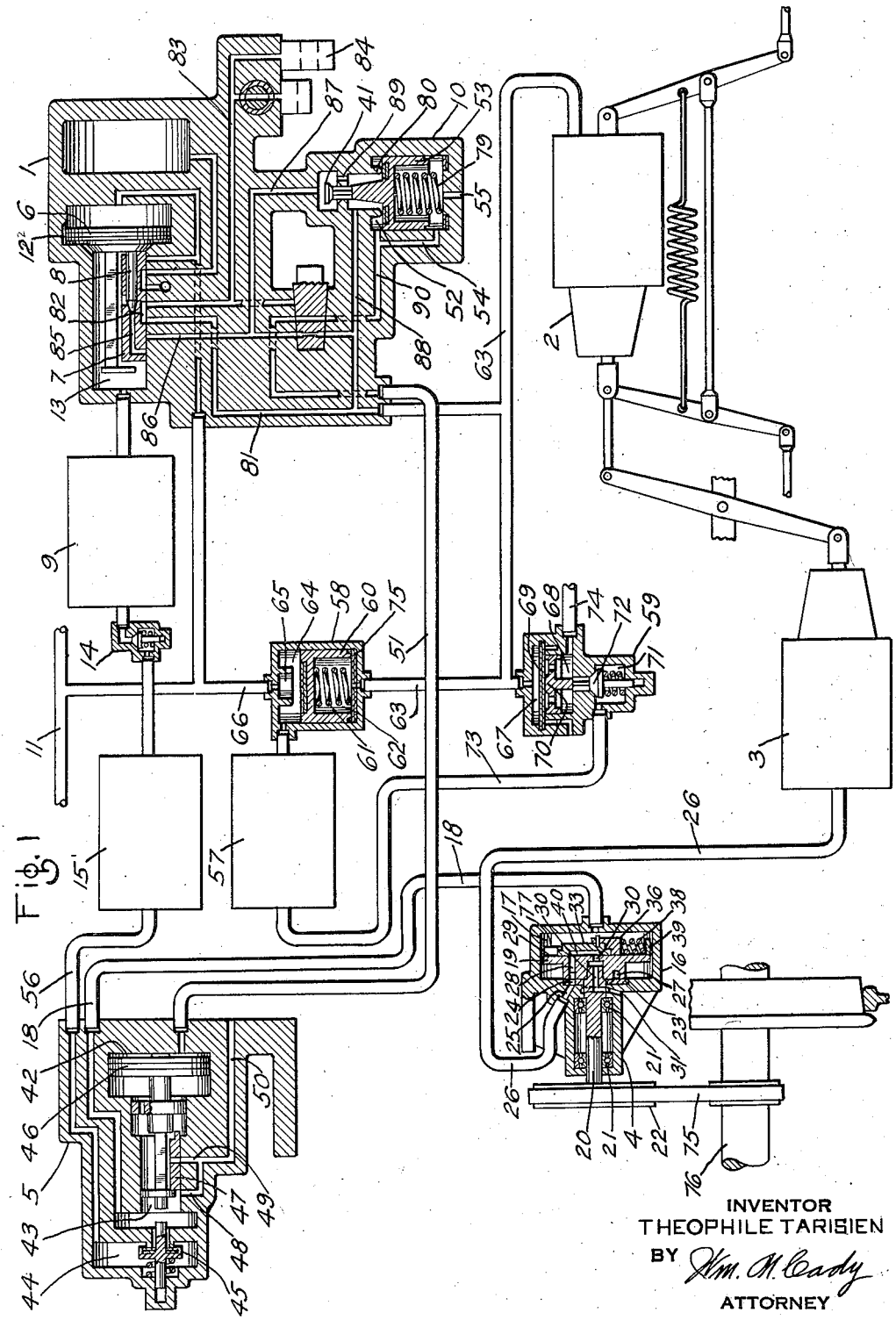

2,061,883

UNITED STATES PATENT OFFICE 2,061,883

HIGH SPEED PASSENGER BRAKE

Theophile Tarisien, Livry-Gargan, France, assignor to The Westinghouse Air Brake Company, Wilmerding, Pa., a corporation of Pennsylvania Application January 8, 1935, Serial No. 809
In France April 11, 1934

12 Claims. (Cl. 303—21)

This invention relates to fluid pressure braking apparatus of the kind in which the braking pressure exerted during an application of the brakes is arranged to be automatically varied in accordance with the speed of the train.

In order that the braking action on a vehicle may be of maximum efficiency under all conditions of operation it is essential that the tangential retarding torque exerted upon the wheels of a vehicle shall as closely as possible correspond to the adhesion of the wheels to the rails so as to produce the maximum retardation, and since the coefficient of friction between brake shoes and the wheels decreases as the speed increases the braking force exerted by brake shoes may be increased as the speed increases without risk of skidding.

One object of the invention is to provide an improved fluid pressure brake apparatus having means controlled by the speed of the vehicle for regulating the degree of a brake application according to the speed of the vehicle.

A more specific object of the invention is to provide an improved fluid pressure brake apparatus having two brake cylinders, and speed responsive means for controlling one of said brake cylinders, whereby the braking force applied to the vehicle will be increased when the speed of the vehicle exceeds a predetermined degree.

Another object of the invention is to provide improved means automatically operative in effecting an application of the brakes to effect sanding of the rails of the track upon which the vehicle is running to thereby increase the adhesion of the vehicle wheels to the rails to reduce the tendency of the wheels to skid.

In the accompanying drawings, Figure 1 is a diagrammatic view, mainly in section, of a fluid pressure braking apparatus embodying the invention; and Figures 2 and 3 are views, on an enlarged scale, in sectional side elevation and in end elevation, respectively, of the speed responsive valve device shown in Figure 1.

As shown in Fig. 1 of the drawings, the fluid pressure braking apparatus comprises a triple valve 1 of well known type, a main brake cylinder 2, an auxiliary brake cylinder 3, a speed controlled valve device 4 and a relay valve device 5.

The triple valve 1 comprises the usual piston 6 controlled by variations in pressure in a brake pipe 11 and adapted to operate a slide valve 7 and a graduating valve 8 so as to control the flow of fluid under pressure from an auxiliary reservoir 9 to the brake cylinder 2 through a regulating valve device 10, which comprises an inshot valve 41, a valve piston 53 for controlling said inshot valve and a spring 79 acting on said valve piston for urging same into engagement with a seat rib 80 and at the same time unseating the inshot valve 41.

The auxiliary reservoir 9 is adapted to be charged with fluid under pressure from the brake pipe 11 through the usual feed groove 12 and the valve chamber 13 of the triple valve 1, and the reservoir 9 is in communication through a check valve 14 with a second reservoir 15 so that the reservoir 15 is also adapted to be charged with fluid at the pressure carried in the brake pipe 11.

The speed controlled valve device 4 is shown somewhat diagrammatically in Fig. 1 but in greater detail in Figs. 2 and 3 from which it will be seen that the valve device comprises a body or casing 16 having a chamber 17 which, as shown in Fig. 1 of the drawings, communicates with the relay valve device 5 by means of a pipe 18. A rotor 19 is located in the chamber 17 and is mounted upon one end of a shaft 20 carried in suitable ball bearings 21 in the casing 16, the opposite end of the shaft 20 being provided with a grooved pulley 22 which is arranged to be driven by a rope or belt 75 from a braked axle 76 of the vehicle.

The inner face of the rotor 19 abuts against an annular bearing plate 23 inset in the inner wall of the chamber 17, the plate 23 being provided with a port 24 leading to a passage 25 which communicates through a pipe 26 with the auxiliary brake cylinder 3. The face of the rotor 19 in contact with the bearing plate 23 is provided with an annular cavity 27 communicating with a port 28 leading to the opposite or outer face 29 of the rotor 19 which is also provided with an axial port 30 leading to an atmospheric outlet 31.

A slide valve 33 is mounted to slide upon the face 29 of the rotor 19 between two spaced parallel guides 77 and is resiliently held in contact with the face 29 by means of a spring 34 mounted upon a segmental member 35 which is rigidly secured to the guides 77. The slide valve 33 is connected with a certain amount of play to a slider 36 adapted to slide between the guides 77. A movable segmental member or mass 37, similar to the rigid member 35, is secured to the slider 36 for moving the slide valve 33 according to the speed of rotation of the rotor 19. This member 37 is slidably mounted in a space formed between the guides 77 and two guide plates 32 which are secured to central raised portions 78 of the guides 77, engagement of said member with said raised portions being adapted to limit inward movement of said member and thereby the slide valve 33. A compression spring 38 is interposed between the slider 36 and an abutment 39 secured to the rotor 19 and tends to maintain the slider 36, the slide valve 33 and the member 37 in their radially inward positions shown in Figs. 2 and 3. The slide valve 33 is provided with a cavity 40 which in the position of the parts shown in the drawings, establishes communication between the ports 28 and 30, while when the slide valve 33 is moved radially outwardly, as hereinafter explained, this communication is closed and the port 28 is opened to the chamber 17.

The relay valve device 5 shown in Fig. 1 comprises a body or casing having a piston chamber 42, a valve chamber 43 and a supply chamber 44, communication between the chambers 43 and 44 being effected through a normally closed spring-controlled supply valve 45. The piston chamber 42 contains a piston 46 adapted to operate a slide valve 47 cooperating with a slide valve seat provided with ports 48 and 49 leading to an atmospheric outlet 50. The piston chamber 42 communicates through a pipe 51 with the usual annular chamber 52 above valve piston 53 of the regulating valve device 10 of the triple valve, the chamber 52 communicating through a passage 54 with an atmospheric outlet 55 of the regulating valve device when the valve piston 53 is held in its normal upper position by the pressure of spring 79, in the usual manner.

The valve chamber 43 communicates with the pipe 18 leading to the speed controlled valve device 4, and the supply chamber 44 communicates through a pipe 56 with the reservoir 15.

In operation, when the brakes are released the parts of the several devices shown in Fig. 1 are in the positions shown in the drawings, the brake cylinder 2 being in communication with the atmosphere through pipe 63, passage 81 in the triple valve device 1, cavity 82 in the triple valve slide valve 7, passage 83 and a baffle fitting 84, in the usual manner. The chamber 52 in the regulating valve device 10 and the chamber 42 in the relay valve device 5 which is open to chamber 52 through pipe 51, are both vented to the atmosphere through passage 54 and the atmospheric outlet 55, while the valve chamber 43 of the relay valve device is open to the atmospheric outlet 50 by way of ports 48 and 49.

If the vehicle is at rest or traveling at less than a predetermined speed the member 37, slider 36, and slide valve 33 will occupy the positions shown in Figs. 1, 2 and 3, due to the action of spring 38, and the brake cylinder 3 will therefore be in communication with the atmosphere by way of pipe 26, passage 25, port 24, cavity 27, port 28, cavity 40, port 30 and outlet 31.

If however the speed of the vehicle is above the predetermined value, the corresponding rotation of the shaft 20 driven by the pulley 22 and effecting the rotation of the rotor 19 and the parts mounted thereon will, by the action of the centrifugal force exerted upon the member 37 cause this member to move radially outwardly against the opposing action of the spring 38, so that through the medium of the slider 36 the slide valve 33 will be pulled to a position in which the port 28 no longer registers with the cavity 40 but is open to the chamber 17 under which conditions the brake cylinder 3 will be in communication with the atmosphere by way of pipe 26, passage 25, port 24, cavity 27, port 28, chamber 17, pipe 18 and valve chamber 43.

If it is desired to effect an application of the brakes, the pressure in brake pipe 11 is reduced in the usual manner, which causes the triple valve piston 6 and thereby the valves 7 and 8 to be moved to application position in which fluid under pressure is permited to flow from the auxiliary reservoir 9 to the brake cylinder 2 through the usual service port 85, passages 86 and 87, past the inshot valve 41 and from thence through passages 88 and 81 and pipe 63. When sufficient pressure is thus obtained in brake cylinder 2 and on the inshot valve piston 53 to overcome the opposing pressure of spring 79, said valve piston 53 is moved to its lower position, which permits the inshot valve 41 to seat so that further flow of fluid under pressure to the brake cylinder 2 occurs through a small port 89. With the valve piston 53 in the lower position, fluid at the pressure obtained in the brake cylinder 2 flows to chamber 52 and from thence through passage 90 and pipe 51 to the piston chamber 42 of the relay valve device 5. The piston 46 is consequently moved towards the left hand carrying with it the slide valve 47 which first covers the ports 48 and 49 to cut off communication between the valve chamber 43 and the outlet 50. Continued movement of the piston 46 towards the left hand then opens the supply valve 45 past which fluid under pressure is supplied from the reservoir 15 to the valve chamber 43 by way of pipe 56, chamber 44 and valve 45. As soon as the pressure in the chamber 43 exceeds the pressure in the chamber 42 the piston 46 is moved towards the right hand to permit the valve 45 to close so that the valve chamber 43 is charged with fluid at the pressure acting in brake cylinder 2 and fluid at this pressure is transmitted from chamber 43 through pipe 18 to the chamber 17 of the speed controlled valve device 4.

As long as the speed of the vehicle and consequently of the rotor 19 of the valve device 4 is less than the predetermined value, the pressure of spring 38 will maintain the slide valve 33 in the position shown in the drawings, so that the brake cylinder 3 will continue to be in communication with the atmosphere by way of cavity 40 in the slide valve 33, as above explained, and the brake cylinder 3 will consequently remain inoperative. If however the speed of the vehicle during the braking application is above this predetermined value, the member or mass 37 and thereby the slide valve 33 will be moved by centrifugal action radially outwardly, against the pressure of spring 38, to uncover the port 28 as already explained, and fluid at the pressure obtaining in the brake cylinder 2 and valve chamber 43 of the relay valve device 5 will then be supplied from the chamber 17 to the brake cylinder 3 by way of port 28, cavity 27, port 24, passage 25 and pipe 26.

The braking action of the brake cylinder 2 will thus be supplemented by the action of the brake cylinder 3 so that the braking pressure exerted upon the wheels of the vehicle will be correspondingly increased so long as the speed of the vehicle is above the predetermined value.

When the speed of the vehicle is reduced to below the predetermined value above mentioned, the pressure of spring 38 will overcome the centrifugal force acting on the member 37 and move said member and thereby the slide valve 33 radially inwardly to the position shown in the drawings, in which the brake cylinder 3 will be vented to the atmosphere as above explained, thus reducing the braking pressure exerted.

It will be seen that as long as the speed of the vehicle does not exceed a predetermined value corresponding to the strength of the spring 38 and the mass of the member 37 and its associated parts, the braking effected will be that due only to the brake cylinder 2 as controlled by the usual action of the triple valve 1. When however this speed is exceeded during braking the auxiliary brake cylinder 3 becomes operative and is supplied with fluid at the pressure obtaining in the brake cylinder 2, so that an increased braking pressure is exerted upon the wheels of the vehicle as is permissible at high speeds. The subsequent reduction in speed of the vehicle below the predetermined value causes the brake cylinder 3 again to become inoperative so that the braking pressure exerted upon the wheels is correspondingly reduced and risk of skidding owing to the higher coefficient of friction at the lower speed is thereby avoided.

The fluid pressure brake equipment comprises in addition to the apparatus hereinbefore described, a sanding reservoir 57, a charging valve device 58 and a sand control valve device 59.

The valve device 58 comprises a valve piston 60 subject on its underside to the action of a spring 61 and the pressure in a chamber 62 which is connected to the pipe 63 leading to the brake cylinder 2. A chamber 64 at the upper side of the piston 60 communicates with the sanding reservoir 57, and the piston 60 when in its upper position closes communication from chamber 64 to a chamber 65 communicating through a pipe 66 with the brake pipe of the apparatus.

The valve device 59 comprises a body or casing divided into a pressure chamber 67 and an operating chamber 68 by means of a flexible diaphragm 69 provided with a piston member 70. The chamber 68 is arranged to communicate with a lower chamber 71 in the casing through a normally closed spring-controlled valve 72, the chamber 71 communicating with the reservoir 57 through a pipe 73. The chamber 68 communicates by means of a pipe 74 with a sanding device (not shown) of any suitable type adapted when fluid under pressure is supplied thereto through the pipe 74 to supply sand to the track rails in the well known manner.

In operation when the braking system is being charged with fluid under pressure, fluid from the brake pipe 11 flows through the pipe 66 to the chamber 65 and acting upon the piston 60 moves the piston downwardly compressing the spring 61 until the lower edge of the piston 60 abuts against a gasket 75 at the base of the chamber 62. Fluid is thereupon supplied to the reservoir 57 charging this reservoir to brake pipe pressure.

So long as the triple valve 1 is in its release position the brake cylinder 2 and the pipe 63 leading thereto are at atmospheric pressure and the chamber 62 of the valve device 58 and the chamber 67 of the valve device 59 are thus also at atmospheric pressure. The valve 72 of the valve device 59 is consequently held closed under the action of its spring and the chamber 71 is thus cut off from the chamber 68.

When however the brakes are applied in the manner hereinbefore described, the brake cylinder pressure in the pipe 63 is transmitted to the chamber 62 of the valve device 58 and to the chamber 67 of the valve device 59. The brake cylinder pressure in the chamber 62 assisted by the action of the spring 61 moves the piston 60 to its upper position shown in Fig. 1, thereby isolating the sanding reservoir 57 from the brake pipe 11. The brake cylinder pressure acting in the chamber 67 of the valve device 59 moves the diaphragm 69 and the piston member 70 downwardly to cause the piston member 70 to engage with the valve 72 and open said valve, whereupon fluid under pressure from the reservoir 57 is supplied through pipe 73, chamber 71, past valve 72 to the chamber 68 and thence through the pipe 74 to the sanding device. By this arrangement, fluid under pressure is automatically and simultaneously supplied for effecting sanding of the track rails when the brakes are applied, and this is particularly desirable in connection with the braking of high speed trains where maximum adhesion of the wheels of the vehicle to the rails is required to avoid skidding of the wheels when employing high braking forces to stop the vehicle.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, a brake cylinder and an auxiliary brake cylinder, of valve means operative upon a reduction in brake pipe pressure for supplying fluid under pressure to both of said brake cylinders, and speed responsive means for controlling the communication through which fluid under pressure is adapted to be supplied to said auxiliary brake cylinder and operative when the speed of the vehicle is less than a predetermined degree to close said communication and vent said auxiliary brake cylinder.

2. In a fluid pressure brake, the combination with a brake pipe, a brake cylinder and an auxiliary brake cylinder, of a brake controlling valve means operative upon a reduction in brake pipe pressure for supplying fluid under pressure to both of said brake cylinders, and speed responsive means for controlling the communication through which fluid under pressure is adapted to be supplied to said auxiliary brake cylinder and operative when the speed of the vehicle exceeds a predetermined degree to open said communication and when less than said predetermined degree to close said communication.

3. In a fluid pressure brake, the combination with a brake pipe, a primary brake cylinder and an auxiliary brake cylinder, of valve means operative upon a reduction in brake pipe pressure for supplying fluid under pressure to a conduit leading to said primary brake cylinder and for supplying fluid under pressure to a communication connecting said valve means to said auxiliary brake cylinder through which fluid under pressure is adapted to be supplied to said auxiliary brake cylinder, and speed responsive means for controlling the flow of fluid under pressure through said communication and operative when the speed of the vehicle exceeds a predetermined degree to permit flow of fluid under pressure through said communication to said auxiliary brake cylinder and as the speed of the vehicle reduces below said predetermined degree to close off all flow through said communication and to open a vent communication to said auxiliary brake cylinder.

4. In a fluid pressure brake, the combination with a brake pipe, a brake cylinder and an auxiliary brake cylinder, of valve means operative upon a reduction in brake pipe pressure for supplying fluid under pressure to both of said brake cylinders, and speed responsive means for controlling the communication through which fluid under pressure is adapted to be supplied to said auxiliary brake cylinder and operative when the speed of the vehicle exceeds a predetermined degree to open said communication and as the speed of the vehicle reduces below said predetermined degree to first close said communication and then open a vent communication to said auxiliary brake cylinder.

5. In a fluid pressure brake, the combination with a brake pipe and a brake cylinder, of valve means operative upon a reduction in brake pipe pressure to supply fluid under pressure to said brake cylinder, an additional brake cylinder, valve means operative according to the pressure acting in the first mentioned brake cylinder to provide a corresponding fluid pressure in said additional brake cylinder, and speed responsive means for controlling the communication through which fluid under pressure is supplied to said additional brake cylinder and operative when the speed of the vehicle exceeds a predetermined degree to open said communication and when less than said predetermined degree to close said communication and to vent said additional brake cylinder.

6. In a fluid pressure brake, the combination with a brake pipe and a brake cylinder, of a valve device operative upon a reduction in brake pipe pressure to supply fluid under pressure to said brake cylinder, another brake cylinder, speed responsive means operative when the speed of the vehicle exceeds a predetermined degree to establish a communication through which fluid under pressure is adapted to be supplied to said other brake cylinder and operative when the speed of the vehicle is less than said predetermined degree to close said communication and to vent said other brake cylinder, and means controlled by the pressure of fluid supplied to the first mentioned brake cylinder for supplying fluid at a corresponding pressure to said communication.

7. In a fluid pressure brake, the combination with a brake pipe, a brake cylinder, and a valve device operative upon a reduction in brake pipe pressure to supply fluid under pressure to said brake cylinder, an inshot valve device initially providing a relatively large flow capacity communication through which fluid under pressure supplied by said valve device flows to said brake cylinder and operative when a predetermined pressure is obtained in said brake cylinder to render said communication ineffective and a relatively restricted communication effective, an additional brake cylinder, valve means operative, upon the operation of said inshot valve means to render said restricted communication effective, to provide a fluid pressure in said additional brake cylinder corresponding to that in the first mentioned brake cylinder, and speed responsive means for controlling the flow of fluid from said valve means to said additional brake cylinder and operative when the speed of the vehicle exceeds a predetermined degree to permit such flow, and when the speed of the vehicle is less than said predetermined degree to cut off such flow and vent said additional brake cylinder.

8. In a fluid pressure brake, the combination with a brake pipe and a brake cylinder, of valve means operative upon a reduction in brake pipe pressure for supplying fluid under pressure to said brake cylinder, and means responsive to the speed of the vehicle for controlling communication through which fluid supplied by said valve means is adapted to flow to said brake cylinder, said speed responsive means being operative when the speed of the vehicle exceeds a predetermined degree to open said communication and when less than said predetermined degree to close said communication and to vent said brake cylinder.

9. In a fluid pressure brake, the combination with a brake pipe and a brake cylinder, of valve means operative upon a reduction in brake pipe pressure for supplying fluid under pressure to said brake cylinder, a rotor operative according to the speed of the vehicle, a valve movable radially on one face of said rotor for controlling communication through which fluid supplied by said valve means is adapted to flow to said brake cylinder and having one position opening said communication and another position closing said communication, a member carried by said rotor and movable radially with respect to said rotor for operating said valve, and a spring for opposing movement of said member, said member being operative by centrifugal force when the speed of the vehicle exceeds a predetermined degree to shift said valve to the first mentioned position and being operative by said spring when the speed of the vehicle is less than said predetermined degree to position said valve in the second mentioned position.

10. In a fluid pressure brake, the combination with a brake pipe, a brake cylinder, a sanding reservoir normally in communication with said brake pipe and thereby charged with fluid under pressure from said brake pipe, and a brake controlling valve device operative upon a reduction in brake pipe pressure to supply fluid under pressure to said brake cylinder, and valve means controlling said communication and operative upon a reduction in brake pipe pressure to close said communication and to vent fluid under pressure from said reservoir for effecting sanding of track rails.

11. In a fluid pressure brake, the combination with a brake pipe, a brake cylinder, a sanding reservoir normally in communication with said brake pipe and thereby charged with fluid under pressure from said brake pipe, and a brake controlling valve device operative upon a reduction in brake pipe pressure to supply fluid under pressure to said brake cylinder, and valve means controlling said communication and operative by fluid under pressure supplied to said brake cylinder to close said communication and to vent fluid under pressure from said reservoir to effect sanding of track rails.

12. In a fluid pressure brake, the combination with a brake pipe and a brake cylinder, of a valve device normally venting said brake cylinder and operative upon a reduction in brake pipe pressure to supply fluid under pressure to said brake cylinder to effect an application of the brakes, a sanding reservoir, charging valve means controlled by the opposing pressures of the brake pipe and brake cylinder and operative when said brake cylinder is vented to supply fluid under pressure from said brake pipe to said sanding reservoir and operative when fluid under pressure is supplied to said brake cylinder to close communication between said sanding reservoir and brake pipe, a valve for venting fluid under pressure from said sanding reservoir to effect sanding of track rails, means for normally seating said valve, and means operative by fluid under pressure supplied to said brake cylinder for unseating said valve.

THEOPHILE TARISIEN.